J. T. SHEA.
VEHICLE WHEEL.
APPLICATION FILED APR. 22, 1908. RENEWED JUNE 6, 1912.
1,052,757.
Patented Feb. 11, 1913.
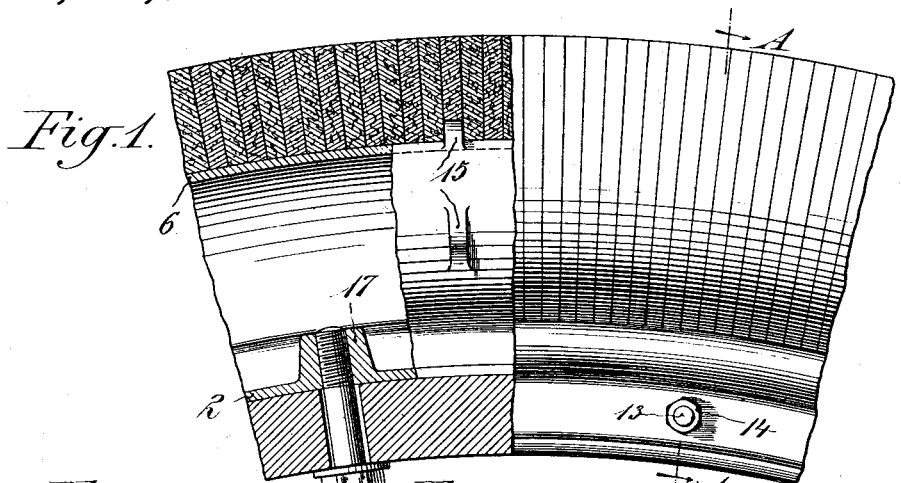
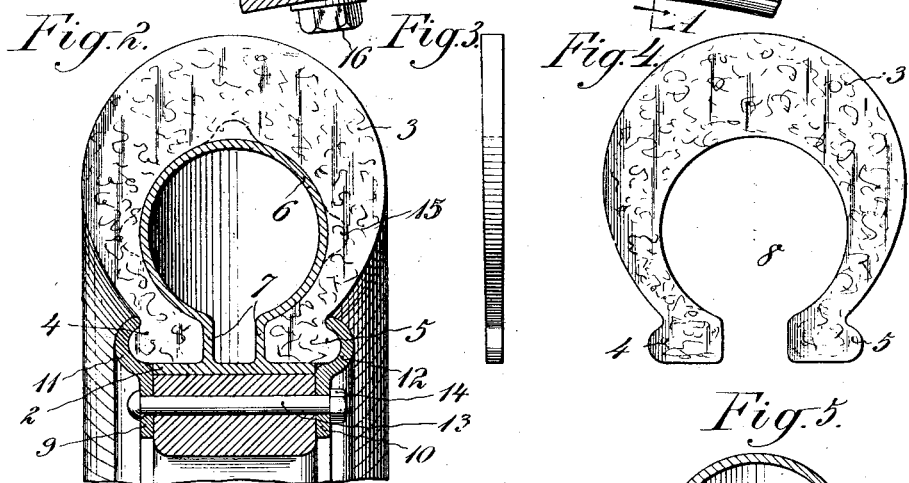
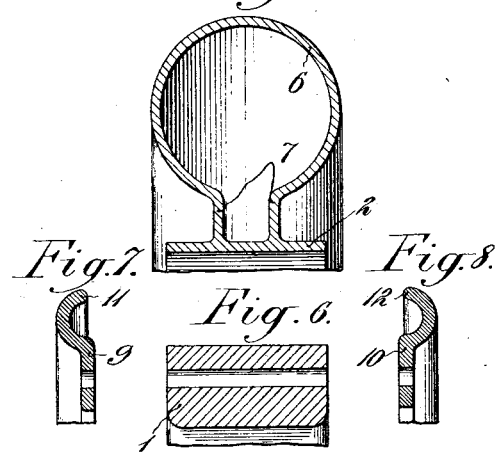
Witnesses:
Inventor:

UNITED STATES PATENT OFFICE.

JOHN T. SHEA, OF GLEN COVE, NEW YORK.

VEHICLE-WHEEL.

1,052,757.  Specification of Letters Patent.  Patented Feb. 11, 1913.

Application filed April 22, 1908, Serial No. 428,683. Renewed June 6, 1912. Serial No. 702,111.

*To all whom it may concern:*

Be it known that I, JOHN T. SHEA, a citizen of the United States, and resident of Glen Cove, in the county of Nassau and State of New York, have invented a new and useful Improvement in Vehicle-Wheels, of which the following is a specification.

My invention consists in an improvement in vehicle wheels and is more particularly directed to the tires thereof, the object being to provide certain improvements in the construction, form and arrangement of the several parts of a vehicle tire whereby an annular series of divided disks may be locked securely around an annular core projecting from the felly rim.

Practical embodiments of my invention are represented in the accompanying drawings in which—

Figure 1 represents a portion of a wheel with my improved tire applied thereto, portions of the same being shown in side elevation and other portions in section. Fig. 2 is a transverse section taken in the plane of the line A—A of Fig. 1, looking in the direction of the arrows, Fig. 3 is an edge view of one of the divided disks, Fig. 4 is a face view of the same, Fig. 5 is a detail section of the felly rim and its core projecting therefrom, Fig. 6 is a detail section through the felly, and Figs. 7 and 8 are sections through the side clamping rings.

The vehicle wheel felly is denoted by 1 and the rim thereon by 2. The tire is composed of an annular series of divided disks 3 made of leather or other suitable material, which disks are provided with hook shaped ends 4, 5. The annular core 6 is connected and formed integral with the rim 2 by a web 7. Each of the disks 3 is provided with a recess 8 fitted to the exterior wall of the core 6 and web 7. Side clamping rings 9 and 10 are provided with curved annular lips 11 and 12 respectively, arranged, when in position, to overlap the hook shaped ends of the divided disks 3 for securing the disks in position. A number of bolts 13 extend through the rings 9 and 10 and the felly 1, which bolts are provided with nuts 14 for securely clamping the side rings to the felly and thereby the disks to their core and rim.

To prevent the disks from sliding around on the core, the core may be provided with a set of lugs 15, as shown in Figs. 1 and 2, arranged around the core in the plane of a disk, the disk being cut away to receive said lugs. There may be one or more sets of these lugs. To prevent the rim from shifting laterally or circumferentially on the felly, a bolt 16 may be inserted radially through the felly into engagement with the rim, as, for instance, by providing the web 7 with a solid portion 17 with which the bolt has a screw-threaded engagement. Any number of these bolts may be used as desired.

In a tire made up as herein described it will be seen that the disks do not have to be strung on a core. By removing the side rings 9 and 10 the disks may be swung over the core and because of the hook shaped ends of these disks and the conformation for the side rings, the clamping of the side rings to the felly will also secure the disks in position absolutely against all possible removal. It will also be seen that any one or more disks may be readily replaced without disturbing the other disks of the tire.

It is evident that various changes might be resorted to in the construction, form and arrangement of the several parts without departing from the spirit and scope of my invention; hence I do not wish to limit myself strictly to the structure herein set forth, but

What I claim is:

1. In a vehicle wheel, a felly, a rim thereon, an annular core connected to the rim by a web, a tire composed of an annular series of divided disks having hook shaped ends, embracing the core, and removable side rings engaging the hook shaped ends of the disks for securing them in position.

2. In a vehicle wheel, a felly, a rim thereon, an annular core formed integral with the rim, a tire composed of an annular series of divided disks embracing the core, and side rings for securing the disks in position.

3. In a vehicle wheel, a felly, a rim thereon, an annular core projecting from the rim, a tire composed of an annular series of divided disks embracing the core, side rings for securing the disks in position, and one or more lugs on the core for preventing the disks from circumferential movement.

In testimony, that I claim the foregoing as my invention, I have signed my name in presence of two witnesses, this twenty-first day of April, 1908.

JOHN T. SHEA.

Witnesses:
F. GEORGE BARRY,
HENRY THIEME.